Sept. 8, 1942.　　　I. W. ROBERTSON　　　2,295,236
VALVE STEM
Original Filed Oct. 3, 1929　　2 Sheets-Sheet 1

INVENTOR
Isaac W. Robertson.
BY
Ely & Barrow
ATTORNEYS

Sept. 8, 1942.   I. W. ROBERTSON   2,295,236
VALVE STEM
Original Filed Oct. 3, 1929   2 Sheets-Sheet 2

Isaac W. Robertson, INVENTOR.

BY Ely & Barrow

ATTORNEYS.

Patented Sept. 8, 1942

2,295,236

UNITED STATES PATENT OFFICE 2,295,236

VALVE STEM

Isaac W. Robertson, La Grange, Ill., assignor, by mesne assignments, to The Dill Manufacturing Company, Cleveland, Ohio, a corporation of Ohio Application October 3, 1929, Serial No. 396,971
Renewed May 17, 1939

4 Claims. (Cl. 152—430)

This invention relates to flexible valve stems adapted to provide means to connect the interior of an inner tube with a source of air.

Difficulty has always been experienced in reaching the old style straight metal valve stem when used on certain types of wheels and rims. Wide, balloon tires and dual wheels have added to this difficulty. To overcome these objections, the straight metal valve stem has been bent and extended so that it can easily be reached. The bent metal valve stem has several undesirable features including primarily difficulty of insertion in the tire supporting rim and in the wheel felloe, thus necessitating special valve stems for special rims and wheels. That is, every bent valve stem requires a rim and a wheel of a certain type and it is difficult and often impossible to substitute another type of valve stem for use with the rim and wheel and vice versa. Metal valve stems are also undesirable in the event of puncturing of the inner tube, since the metal valve stem is fastened to the rim or felloe of the wheel with the result that its base is pulled out of the tube when the tire goes flat.

It is an object of the invention to overcome the above disadvantages by providing a flexible valve stem which is capable of use with a variety of types of rims and wheels.

Again it is an object of the invention to construct a flexible valve stem which can readily be inserted into or withdrawn from the holes in the rim and wheel felloe which are adapted to receive it.

Other objects of the invention will become apparent from a study of the drawings and the disclosure, it being understood that the invention is not to be limited to the specific form described and illustrated.

Figure 1:
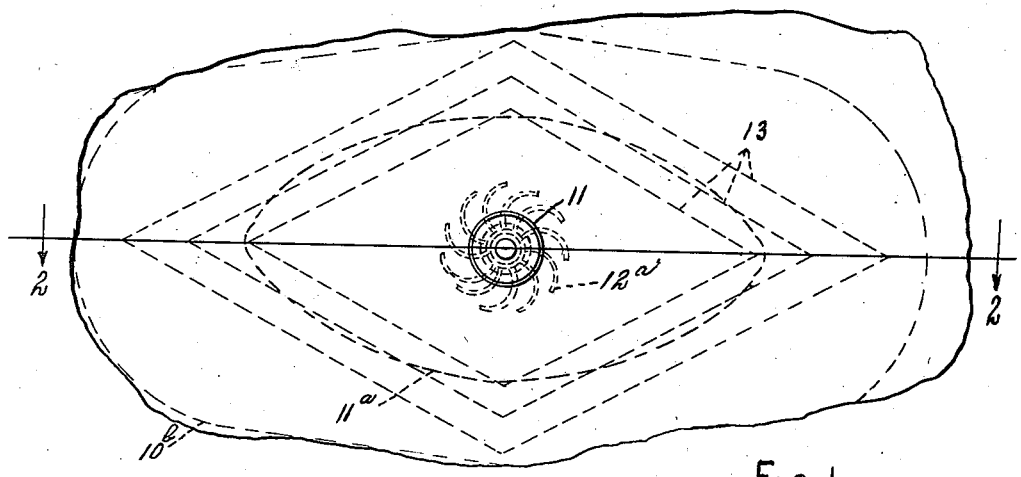
Figure 1 is a plan view of a valve stem embodying the invention, showing a portion of the inner tube to which it is attached.
Figure 2:
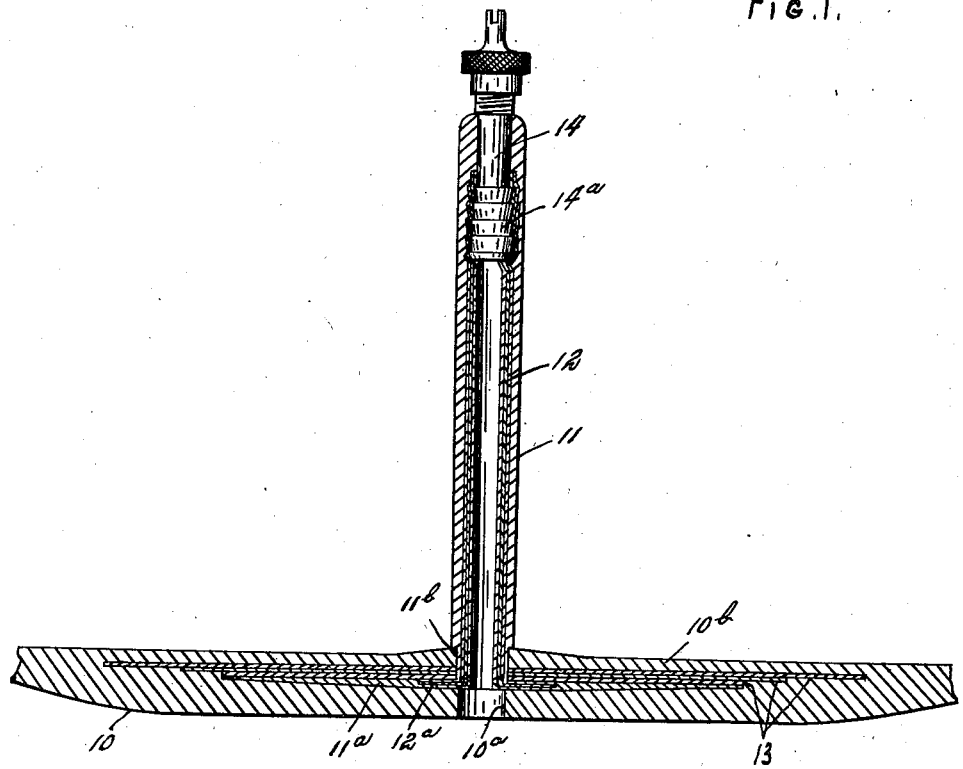
Figure 2 is a sectional view on line 2—2 of Figure 1.

In the embodiment of the invention shown in the drawings, an inner tube 10 having a valve stem hole 10$^a$ therein is provided with a flexible hose-like rubber valve stem 11, which is attached to the inner tube in a position to cooperate with the hole 10$^a$ thereof. The flexible rubber of the valve stem 11 may be reinforced with suitable rubberized fabric 12 which, while preventing distortion of the stem, yet allows it to be easily bent in any desired direction and position.

The stem 11 is formed with a flared flat base 11$^a$ of elliptical shape in which a portion of the fabric reinforcement 12 of the stem extends as indicated at 12$^a$. This reinforcement assists in preventing the stem from pulling out of its base 11$^a$. Above the elliptical base 11$^a$ of the stem, are a number of rubberized reinforcing patches 13 which may be diamond shaped as shown, and above the patches 13 is a comparatively thick rubber patch or pad 10$^b$ of rubber stock similar to that of the tube so that upon vulcanization the pad 10$^b$ will unite integrally with and appear as part of the inner tube. The lower portion of the stem 11 may be formed with an annular groove 11$^b$ which assists in uniting the stem and the pad 10$^b$.

In the upper end of the valve stem is secured a short metal valve 14 having the usual threaded end portion and cap as is well known in the art. The lower end of the valve 14, however, is formed with integral locking flanges 14$^a$ which are adapted to be surrounded by the fabric 12 and rubber of stem 11 as shown. This structure is adapted to hold the valve in the end of the flexible stem 11 by means of the mechanical interlocking of the flanges and the chemical bonding of the rubber cured to the metal valve.

In providing an inner tube with the flexible valve stem, the stem 11 is preferably first completely built so as to have the flared base 11$^a$ at one end and the metal valve 14 in the other, after which the stem assembly is preferably vulcanized in order to obtain a bond between the rubber and the metal valve stem which provides an air-tight seal and obviates the use of a metal ferrule on the outside of the rubber stem for sealing purposes. The adhesion of the rubber to the metal also assists in preventing the metal valve from being pulled out of the rubber stem. The stem is then placed over the hole 10$^a$ in the inner tube, which is unvulcanized, so that the bore of the stem is in alignment therewith and so the flat flared base 11$^a$ of the stem is against the surface of the tube. The uncured rubberized fabric patches 13 and the unvulcanized rubber pad 10$^b$ are then slipped over the stem and stitched down against the base 11$^a$ and the tube 10, after which the tube is vulcanized.

When the tube is vulcanized, the patches 13 and the pad 10$^b$ are also vulcanized, whereby a firm, strong, unitary bond is obtained between the flexible stem and the inner tube.

Figure 3:
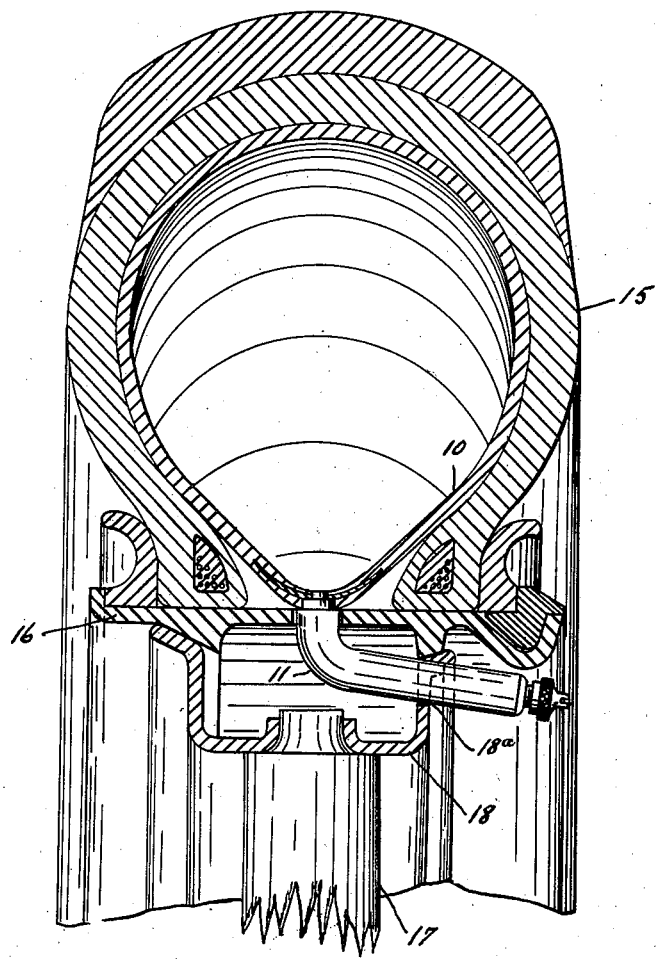
Figure 3 is a sectional view through a wheel, rim and tire assembly, showing the invention in use.

In Figure 3, an inner tube 10, having a flexible valve stem 11, is carried in a tire casing 15 which is secured on a rim 16. The rim 16 is mounted as shown on a wheel indicated at 17 through the agency of a metal felloe 18 which has an opening 18a in its sidewall to permit the valve stem to protrude therethrough.

As shown in the drawings, aperture 18a is made larger in diameter than the flexible valve stem 11 to provide sufficient clearance so that the valve stem can readily be inserted into or withdrawn from the aperture in the rim.

When the tire and tube are placed on the rim, the valve stem will be in a straight position or it may be bent at will to any position to assist in placing the tube and tire on the rim. Such a procedure is impossible with the bent metal valve stems. In order to place a tire and a tube having a bent metal valve stem on a rim, it is often necessary to provide a transverse slot in the rim which allows the stem to be slid in sideways. The slot, however, leaves a portion of the rim open through which the tube tends to bulge when inflated, and which gives free access of water and dirt to the inside of the tire. Other equally awkward and disadvantageous structures have been resorted to in order to use bent metal valves.

Not only does the flexible stem assist in permitting the tire and tube to be placed on the rim, but it materially assists in placing the rim on the wheel felloe. The flexible stem can be bent to any desired angle to cooperate with a plurality of types of wheels and rims as is apparent.

Various modifications of the invention can be resorted to without departing from the spirit of the invention or the scope of the appended claims.

What is claimed is:

1. An inner tube comprising a rubber valve stem having a base flange disposed between the inner and outer layers which form the tube wall.

2. An inner tube comprising a rubber valve stem having an integral base flange that is vulcanized in the tube wall interiorly of its structure, to provide a unitary structure.

3. An inflatable rubber article comprising a wall of relatively flexible, elastic, rubber composition, and a valve stem having a base flange of rubber composition, said base flange being vulcanized within the article wall between the inner and outer surfaces thereof.

4. An inflatable rubber article comprising a wall of relatively flexible, elastic, rubber composition, and a valve stem having a base flange of relatively stiff, tough rubber composition, said base flange being vulcanized within the article wall between the inner and outer surfaces thereof.

ISAAC W. ROBERTSON.